(12) United States Patent
Wills et al.

(10) Patent No.: US 10,393,853 B2
(45) Date of Patent: *Aug. 27, 2019

(54) RADIO SIGNAL PATH DESIGN TOOL HAVING CHARACTERIZATION BEYOND PROPOSED ANTENNA SITES

(71) Applicant: Wireless Applications Corp., Bellevue, WA (US)

(72) Inventors: Eric Wills, Bellevue, WA (US); Abdelelah Salama, Bellevue, WA (US)

(73) Assignee: Wireless Applications Corp., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,604

(22) Filed: Apr. 6, 2018

(65) Prior Publication Data

US 2018/0299529 A1    Oct. 18, 2018

Related U.S. Application Data

(60) Provisional application No. 62/483,079, filed on Apr. 7, 2017.

(51) Int. Cl.
*H04W 16/18* (2009.01)
*G01S 5/02* (2010.01)
(Continued)

(52) U.S. Cl.
CPC .......... G01S 5/021 (2013.01); G01S 5/0215 (2013.01); G06G 7/78 (2013.01); H04B 17/27 (2015.01);
(Continued)

(58) Field of Classification Search
CPC ....... H04W 16/18; H04W 4/029; H04W 4/02; H04W 28/04; H04W 52/0245; H04W 52/283; H04W 64/006; H04W 16/26; H04W 4/021; H04W 4/023; H04W 64/00; H04W 52/265; H04W 16/00; H04W 4/025; H04W 16/02; H04W 64/003; H04W 16/24; H04W 16/28; H04W 4/027; H04W 52/343; H04W 88/06; H04W 16/32; H04W 36/32; H04W 52/242; H04W 52/243;
(Continued)

(56) References Cited

U.S. PATENT DOCUMENTS

2009/0061941 A1 *  3/2009  Clark .................... H01Q 1/125
                                                     455/562.1

* cited by examiner

*Primary Examiner* — Nimesh Patel
(74) *Attorney, Agent, or Firm* — Perkins Coie LLP

(57) ABSTRACT

A radio signal path design tool that allows radio link propagation path profiling or path-loss measurement where the link partner antenna towers are located in a proposed fixed location on the earth's surface, but are extendable a certain distance in any direction from the fixed location. The design tool can be used to compute a radio link path profile at the proposed tower location, while still correctly representing terrain variations in a variable path extension distance on either side of the radio link. To correctly represent terrain variations across the depicted portion of the earth's surface, the tool computes and applies a modified earth-bulge factor or k-factor. The variable extension distance on either side of the radio link allows for latitudinal and/or longitudinal variations in antenna tower placement, greatly facilitating the identification of appropriate positions of antenna towers during the wireless link design phase.

18 Claims, 6 Drawing Sheets

(51) Int. Cl.
*H04B 17/391* (2015.01)
*H04B 17/27* (2015.01)
*G06G 7/78* (2006.01)
*H04W 24/10* (2009.01)

(52) U.S. Cl.
CPC ........ *H04B 17/3912* (2015.01); *H04W 16/18* (2013.01); *H04W 24/10* (2013.01)

(58) Field of Classification Search
CPC ..... H04W 72/04; H04W 72/082; H04W 4/00; H04B 17/318; H04B 17/3913; H04B 10/116; H04B 17/27; H04B 17/373; H04B 7/2606; H04B 10/071; H04B 10/07955; H04B 10/1123; H04B 10/1129; H04B 17/309; H04B 17/382; H04B 1/707; H04B 7/18519; H04B 7/022; H04B 7/0671; H04B 7/082; H04B 7/0857; H04B 7/0617; H04B 7/12; H04B 7/15542; H01Q 3/267; H01Q 15/02; H01Q 1/242; H01Q 1/244; H01Q 21/065; H01Q 3/24; H01Q 3/242; H04L 1/02; H04L 67/12; H04L 51/04; H04L 51/20; H04L 51/32; H04L 67/10; H04L 67/104; H04L 67/18; H04L 67/30; H04L 1/0003; H04L 1/00; G01S 19/41; G01S 19/42; G01S 17/023; G01S 17/89; G01S 19/50; G01S 5/021; G01S 5/0215; G01S 5/0236; G01S 5/0252; G01S 5/0273; G01S 19/51; G01S 5/0027; G01S 5/14; G01S 5/02; G01S 15/60; G01S 5/10; G01S 5/06; G01S 5/0257; G01S 13/885; G01S 13/58; G01S 19/40; G01S 3/52; G05D 1/0278; G05D 1/027; G05D 1/0221; G05D 1/0257; G05D 1/0212; G05D 1/0238; G05D 1/028
See application file for complete search history.

RADIO SIGNAL PATH DESIGN TOOL HAVING CHARACTERIZATION BEYOND PROPOSED ANTENNA SITES

RELATED APPLICATIONS

This application claims priority to and benefit from U.S. Provisional Patent Application No. 62/483,079, entitled "Radio Signal Path Design Tool Having Characterization Beyond Proposed Antenna Sites," filed on Apr. 7, 2017, which is hereby incorporated by reference in its entirety.

BACKGROUND

In order to ensure reliable radio communication between terrestrial locations, it is important to have a reliable method of estimating the extent to which the radio signals attenuate (i.e., to estimate the path loss) as the signal propagates between the locations. Radio signal propagation in free space is affected by a variety of phenomena including diffraction, refraction, reflection, absorption by the atmosphere, and obstruction by material and by the earth's horizon. The radio link budget which takes into account all the gains and losses from the transmitter, through the medium, to the receiver depends on a variety of factors including antenna properties (gain, directivity, front-to-back ratio, etc.), frequency or wavelength of the radio signal, interferers, natural and man-made obstructions, environmental factors such as altitude and weather, link distance, and antenna height, among other factors. Generally, the more the path between the transmitter and the receiver antennas is clear from obstructions, the less the signal losses. One way to ensure that the path is free of obstructions is to raise the height of the transmit and/or receive antennas above any obstructions that might exist along the path ensuring sufficient clearance within the first Fresnel zone. However, raising antenna heights come with additional costs including equipment costs, constructions costs, costs to obtain the relevant permits and approvals, and maintenance costs. As such, when designing radio links it is beneficial to design radio antenna towers so that they are as tall as they need to be for reliable, high throughput and low latency links, but are no taller. To assist in designing radio links, wireless engineers typically utilize a radio path design tool in the design process. A radio path design tools allows the wireless engineer to model the radio path between two proposed locations for radio antenna towers.

One of the limitations in existing radio path design tools is that the tool computations are based on pre-determined latitude and longitude coordinates for transmitting and receiving antenna towers. Any latitudinal or longitudinal deviation to the placement of either antenna after the radio link is designed affects the computed radio propagation parameters and may thereby result in unreliable radio links. In actual deployment scenarios, it is not uncommon that the radio link deployment team might prefer to change the placement of antenna towers away from where the initial site analysis team envisioned their placement. For example, the deployment team might realize that moving an antenna tower a certain distance away from the originally identified site may result in tower construction economies, for example, by reducing tower height when erected on an adjacent hill or other elevated topography, or by avoiding other construction hazards in chosen site. Unfortunately, existing tools provide little flexibility in antenna tower placement from the beginning of the design phase. FIG. 1, for example, depicts a point-to-point path profile 50 generated by an example of a currently-available radio frequency signal propagation and signal loss design tool. The path profile 50 depicts the placement of a first tower 55 at one margin of the interface and a second tower 60 at the other margin of the interface. In between the two towers, the path profile 50 depicts intervening terrain 67, the Earth's curvature contour 65, and the path link 70. By only considering the terrain and Earth's curvature contour between the first tower 55 and second tower 60, the prior art design tool fails to provide much design flexibility for wireless engineers designing radio links. For example, the radio link designer is unable to readily ascertain that the antenna towers are on optimal sites just by looking at the path profile 50. It could be that the current proposed location for one of both of the antenna towers is on a hill slope such that, by relocating the antenna(s) to the top of the hill, much shorter antenna towers would need to be erected to yield a line-of-sight path without substantially affecting link budget when the path link 70 distance increases. Additionally, it could turn out that the proposed site for locating the first tower 55 or the second tower 60 proves infeasible during site construction. In this case, wireless engineers using prior art design tools would have to repeat the path link design after extending the path link 70 in order to verify that new tower sites also meet the target link budget—for example, to verify that the line-of-sight path 75, first Fresnel zone line 77, or 60% of first Fresnel zone line 76 is still clear of obstructions after extending the path link 70 beyond what is currently depicted in path profile 50. Such prior art radio path design tools often result in the selection of suboptimal sites for antenna deployment, or cause an undue amount of effort to be undertaken by engineers in order to arrive at satisfactory sites.

DETAILED DESCRIPTION

Figure 1:
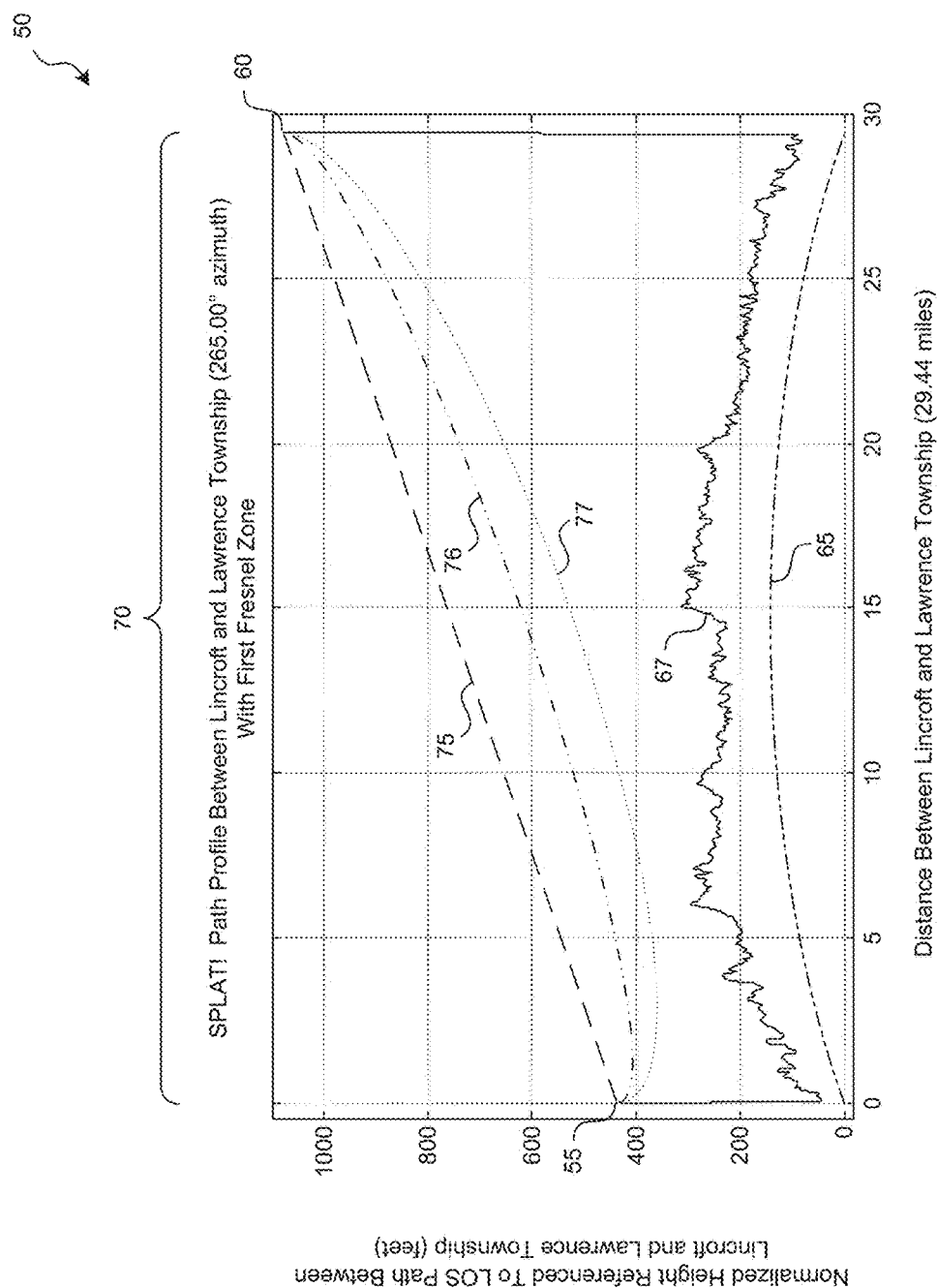
FIG. 1 is representative path profile generated by an example prior art radio signal path design tool with end points located at the edge of the analysis.

A radio signal path design tool that allows radio link propagation path profiling or path-loss measurement where the link partner antenna towers are located in a proposed fixed location on the earth's surface, but are extendable a certain distance in any direction from the fixed location is disclosed herein. The disclosed design tool can be used to compute a radio link path loss profile at the proposed tower location, while still correctly representing terrain variations in a variable path extension distance on either side of the radio link. The variable extension distance on either side of the radio link allows for latitudinal and/or longitudinal variations in antenna tower placement, greatly facilitating the identification of desirable positions of antenna towers during the wireless link design phase. That is, the tool allows for ready visualization and assessment of a radio link path extension beyond the target path, which thereby allows the variation in antenna tower placement without repeating the design.

In one aspect of the disclosed radio signal path design tool, a method for radio signal propagation path profiling is disclosed which involves computing a distance on either side of a proposed radio link by which to extend a path profile computation. The extra distance on either side of the proposed radio link is used to compute new coordinates defining the boundary of an extended link. An extended radio link distance is then computed which represents the sum of the original link distance and the extra distance on either side of the link. Alternatively, the extended radio link distance may be computed from the computed new coordinates defining the boundary of the extended link. An earth curvature correction value is then computed at numerous sample points along the extended radio link distance. Using the computed earth curvature correction values along the extended distance, and earth curvature correction values along the proposed distance, and various properties of the earth curvature correction function used to generate the earth curvature correction values, a modified earth bulge factor, k value, is obtained. Radio signal propagation path parameters associated with the proposed link path are then computed by retaining the original coordinates without the path extension and replacing the original earth bulge factor with the computed modified earth bulge factor value. The computed path parameters are used throughout the radio signal path design tool as needed in different functionalities such as visual rendering of the radio link in a graphical user interface display.

Various embodiments of the disclosed radio link path design tool will now be described. The following description provides specific details for a thorough understanding and an enabling description of these embodiments. One skilled in the art will understand, however, that the tool may be practiced without many of these details. Additionally, some well-known structures or features may not be shown or described in detail so as to avoid unnecessarily obscuring the relevant description of the various embodiments. The terminology used in the description represented below is intended to be interpreted in its broadest reasonable manner, even though it is being used in conjunction with a detailed description of certain specific embodiments of the tool.

Figure 2:
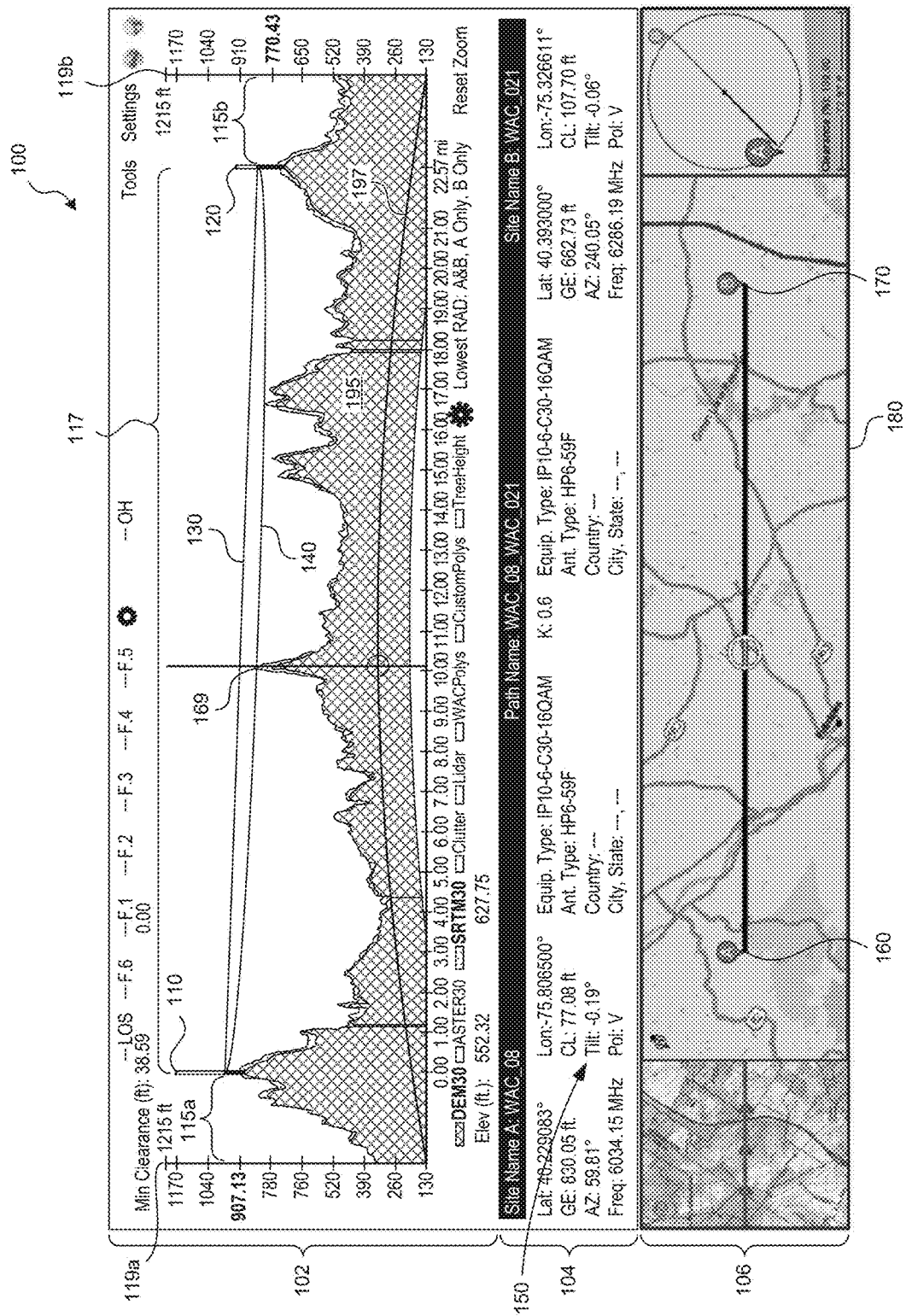
FIG. 2 is a representative user interface of an exemplary radio signal path design tool with an extended range of analysis showing a line-of-sight path and a first Fresnel zone boundary of a radio link.

FIG. 2 is a representative user interface of an exemplary radio signal path design tool 100 showing a line-of-sight path 130 and a first Fresnel zone boundary 140 of a radio link. As will be discussed in additional detail herein, the path design tool 100 may be realized as a web application via a web browser in client devices such as desktops, laptops, tablets, or other mobile devices. It may also be implemented as an executable application on a machine running Windows, Macintosh, Linux, or other operating systems.

The path design tool 100 interface is divided into three sections 102, 104, and 106. The first section 102 depicts a graphical representation of a horizontal cross-section of the air interface between two proposed radio towers. In particular, as will be described in additional detail herein, the first section 102 accurately reflects the terrain in areas extending beyond the location of the two proposed radio towers. The second section 104 includes a number of parameters characterizing the proposed placement of the two radio towers and the communication link between the towers. The third section 106 depicts a graphical representation of an aerial view of the two radio towers as placed on a topography map (or alternatively, on a street or satellite view map). It will be appreciated that the use of three sections is only exemplary, and other interfaces having windowing, pop-ups, or other GUI elements could be used to represent the data depicted in the three sections.

In order to design a radio link with the radio signal path design tool 100, a user enters various link parameters 150 that are depicted in the second section 104. The entered parameters include the latitudes and longitudes of a first antenna site 110 (referred to herein as "site A") and second antenna site 120 (referred to herein as "site B"). The latitude and longitude of site A are represented by the coordinates $(\Phi_A, L_A)$ and latitude and longitude of site B are represented by the coordinates $(\Phi_B, L_B)$. The user also enters other parameters needed by the radio signal path design tool. The parameters may be determined by selecting the desired antenna and/or radio models from an existing database of antennas, in which case the design tool uses stored parameters associated with the selected antenna and/or radio. Alternatively or additionally, the parameters may be specified by manual entry of antenna and radio parameters, such as the antenna gain, beam-width, frequency, VSWR, impedance, polarization, radio transmit power, modulation, coding rate, receiver sensitivity, among other parameters. Additional parameters that are depicted in the second section 104 may be computed or derived by the tool using the entered or stored parameters. For example, the radio signal path design tool 100 computes the distance d between site A and site B based on the entered site coordinates. The distance d may be computed by the design tool using Vincenty's formulae which model the earth as an oblate spheroid. When the design tool is used by a wireless engineer, one or both of the tower locations are proposed locations, meaning that the tool is being used to help select an appropriate tower site for one or both towers.

Using the entered latitude and longitude information, the radio signal path design tool generates a profile of the link depicted in first section 102 as well as an aerial topography, satellite, or street map view of the link depicted in the third section 106. To generate the interface in the first section 102, the radio signal path design tool 100 imports terrain data or clutter data 195 to provide a visual display of the radio link at site A 110 and at site B 120. Terrain data includes land features such as mountains, hills, plateaus, rivers, bodies of water, etc. Clutter data includes any man-made or natural features extending above the terrain, such as trees, buildings, houses, antennas, utility poles, light poles, etc. As will be described in additional detail with respect to FIG. 3, the depicted radio path profile is appropriately modified to account for the earth's curvature 197 over the entire represented terrestrial segment. The design tool may obtain the terrain or clutter data 195 or other appropriate land use/land cover data from, for example, USGS DEM30, SRTM 30, or ASTER datasets, or from custom user-entered obstructions or variations of LiDAR datasets, among others. To generate the interface in the third section 106, the radio signal path design tool 100 can import map data from, for example, Google™ maps, Bing™ maps, or it can import any custom map data in a variety of formats from other mapping services through an appropriate API or manually. The map data allows the design tool to provide a visual display of the radio link between sites A and B by providing a topography, street, or satellite view map.

Of particular benefit to users of the radio signal path design tool 100 is the extended terrain or clutter information that is presented beyond the location of the two radio towers in the first section 102. In particular, the interface includes a first path extension region 115a and a second path extension region 115b that extend beyond the proposed path region 117 between the two towers (i.e., the region corresponding to the proposed communication path link). The path extension regions facilitate link design, since a user is able to quickly ascertain whether the towers are in satisfactory locations, and what link impact would result by the relocation of a tower in a direction further away from the other tower. As will be shown in the discussion of FIG. 3, however, accurately computing and displaying the path profile between site A 110 and site B 120 while properly accounting for the terrain and clutter in the path extension regions 115a and 115b is a non-trivial exercise.

In some embodiments, the size of the path extension regions 115a and 115b may be specified by the user. An interface (not shown) generated by the path design tool 100 may allow the user to specify the size of the path extension regions 115a and 115b as a percentage of the path region 117 distance (e.g., to set each path extension distance equal to 10% of the distance of the path region 117). Alternatively, the interface generated by the path design tool 100 may allow the user to specify the size of the path extension regions 115a and 115b as an absolute distance (e.g., to set each path extension distance to 500 meters). In some embodiments, the size of the path extension regions 115a and 115b are determined by an administrator of the path design tool 100 and is not variable. For example, the path extension distances may always be fixed at 10% of the proposed path region 117 distance. While it is envisioned that the path extension regions are typically the same size, the path extension regions may have different sizes. For example, one path extension region may be 5% of the path link distance and the other path extension region may be 10% of the path link distance. Additionally, while two path extension regions 115a and 115b are shown in FIG. 2, it will appreciated that only one path extension region associated with one of the towers may be generated and displayed by the path design tool 100. In such an event the other tower would have no depicted path extension region.

Figure 3:
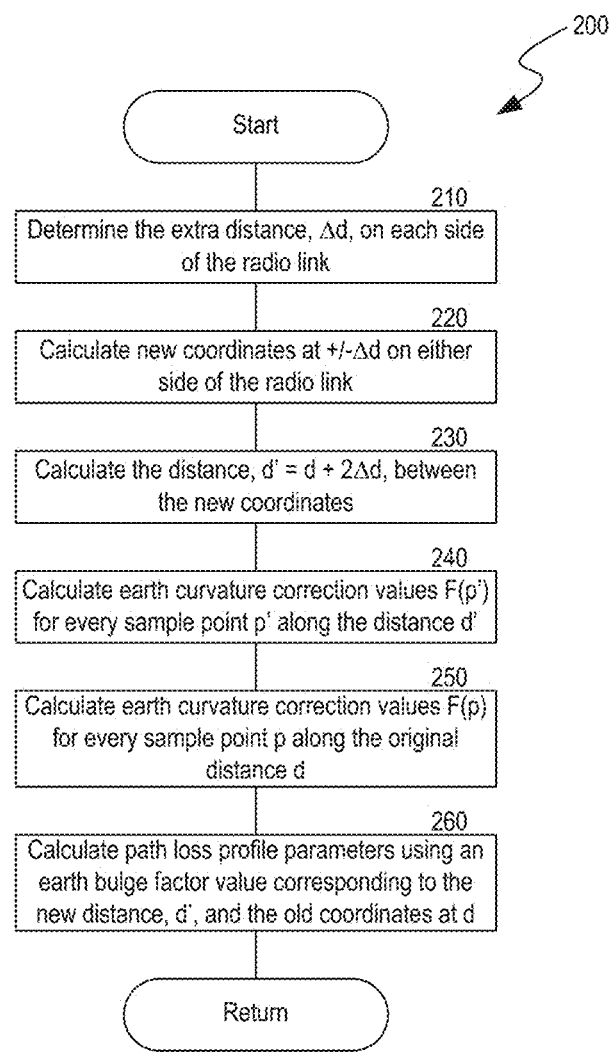
FIG. 3 is a flow diagram of a method for computing the path-loss profile given variable antenna tower placement on either side of the radio link.

FIG. 3 is a flow diagram 200 of an exemplary method for computing the path-loss profile given a variable antenna tower placement location on either side of the proposed radio link between site A 110 and site B 120 (in FIG. 2). At block 210, the radio signal path design tool 100 determines the extra distance, Δd, of the path extension regions 115a and 115b (in FIG. 2) on either side of a radio link by which to extend the path loss computation. As previously discussed, in some embodiments the extra distance is set as a percentage of the original path distance. For example, the extra distance could be fixed as 10% of the original path length such that if the original path was 10 km long, the extra distance by which to extend the path loss profile computations would be 1 km beyond site A 110 and 1 km beyond site B 120. In some embodiments, the extra distance could be fixed as an absolute value independent of the link distance, such as for example, extension to 200 meters on either side of the link, or 200 meters beyond site A 110, and 200 meters beyond site B 120. Other embodiments could apply any other variations to determine path extension distance including fixed and variable distance extensions, distance extension proportional to some other parameter such as radio signal wavelength or frequency, tower height, etc. In some embodiments, the extra distance is user configurable. In these embodiments, a user provides input as to the extra absolute or variable distance or selects from a list of distance computation methods. For example, the user might select to base the extra distance on the original path distance and provide a percentage variation that they would like to extend the link distance, up to a maximum selection set by the path design tool 100. In some embodiments, the user selects predefined distance extension values on either side of the radio link. For example, the path design tool could provide for a choice of 5% extension on either side, 10% extension on either side, 5% extension at site A and 10% extension at site B, 10% extension at site B and 5% extension at site B, or any other predetermined permutations of path extension distances on either side of the radio link. Although the discussions in this disclosure are based on point-to-point links, a person having ordinary skill in the art will appreciate that the same path extension methodology equally applies to point-to-multipoint radio links.

At block 220 the extra distance, Δd, on either side of the radio link obtained at block 210 is used to compute new coordinates at ($\Phi'_A$, $L'_A$) and ($\Phi'_B$, $L'_B$) which define the boundary of an extended link covering a distance d+2Δd. "Φ'" represents the latitude coordinates, and "L'" represents the longitude coordinates for the extended link which goes through and beyond the towers located at original site A 110 and site B 120. In some embodiments, the new coordinates are computed from the proposed tower coordinates (i.e., from ($\Phi_A$, $L_A$) and ($\Phi_B$, $L_B$)) using Vincenty's formulae which model the earth as an oblate spheroid. In some embodiments, other methods of computing the new coordinates may be employed using various approximations of the distance between the antenna tower sites resulting from different models of the earth's geometry. As will be described in additional detail herein, the path design tool 100 uses the new coordinates ($\Phi'_A$, $L'_A$) and ($\Phi'_B$, $L'_B$) in lieu of the proposed tower coordinates ($\Phi_A$, $L_A$) and ($\Phi_B$, $L_B$) as needed to compute different path profile parameters and for different functionalities within the tool. For example, the path design tool uses the new coordinates to plot the clutter or terrain data at the extension regions and the old coordinates for visual rendering of the proposed radio link in a graphical user interface display.

At block 230, the path design tool 100 computes an extended radio link distance, d', which represents the sum of the original link distance and the extra distance on either side of the link, i.e., d'=d+2Δd. The extended radio link distance may be computed from the computed new coordinates defining the boundary of the extended link. That is, the extended distance represents the ellipsoidal distance between the coordinates at site A 110 ($\Phi'_A$, $L'_A$) and the coordinates at site B 120 ($\Phi'_B$, $L'_B$).

At block 240, the path design tool 100 computes an earth curvature correction value F(p') at multiple sample points along the computed new distance, d'. The earth curvature correction value is used by the tool to correctly model and depict the path 130 and Fresnel lines (e.g., Fresnel boundary 140) between the proposed location of the two towers in the first section 102 of the user interface (i.e., for distance d), even though the terrain and clutter in the interface is depicted for the entire extended path (i.e., for distance d'). In some embodiments, the earth curvature correction value at any point, p', along the segment (−d'/2) and (d'/2) is given by the following equation:

$$F(p') = \frac{\left(\frac{d'}{2} + p'\right) * \left(\frac{d'}{2} - p'\right)}{1.5k}$$

Where p'∈{−d'/2, . . . , d'/2}, and k is the earth-bulge correction factor or k-factor, a correction factor used to compensate for atmospheric diffraction. In normal weather conditions, the value of k is typically 4/3. Depending on conditions being modeled, however, the value of k can be greater than 4/3 or near to or less than 1. The user may increase or decrease the value of k to predict how weather conditions may affect the computed path profile. Such adjustment typically ranges between +/−5% of the typical value of k. (d'/2+p') is the horizontal distance from a boundary 119a of the extension region 115a to the point p' being corrected. (d'/2−p') is the horizontal distance from the point p' being corrected to a boundary 119b of the extension region 115b. The earth curvature correction value at point p', F(p'), is the difference in feet between the corrected elevation considering the earth curvature correction factor, and the actual elevation. The number of sample points selected by the path design tool 100 depends, in part, on the length of the path being modeled, the resolution of the path that is to be displayed, and the processing power of the underlying processors. In typical implementations, the number of sample points may be 2000 or more.

At block 250, the path design tool 100 computes an earth curvature correction value F(p) at multiple sample points along the proposed distance, d. In some embodiments, the earth curvature correction value at any point, p, along the segment (−d/2) and (d/2) is given by the following equation:

$$F(p) = \frac{\left(\frac{d}{2}+p\right)*\left(\frac{d}{2}-p\right)}{1.5k}$$

Where p∈{−d/2, . . . , d/2}, and k is the earth-bulge factor or k-factor. (d/2+p) is the horizontal distance along the path region 117 from site A 110 to the point p being corrected. (d/2−p) is the horizontal distance along the path region 117 from the point p being corrected to site B 120. The earth curvature correction value at point p, F(p), is the difference in feet between the corrected elevation considering the earth curvature correction factor, and the actual elevation.

At block 260, the earth curvature correction values computed at block 240 for all sample points along the extended distance, d', is used together with the earth curvature correction values computed at block 250 along the proposed distance, d, to determine a modified k-factor value, k', for the proposed distance, d. Properties of the earth curvature correction function that simplify this computation, as well as the methodology to compute k' itself are discussed in description of FIG. 3 below. In some embodiments, the modified k-factor value, k', is obtained directly from the earth curvature correction values obtained at block 240 for the extended radio link distance, d', without the intervening step of determining the earth curvature correction values at block 250 along the original distance, d. The modified k-factor value, k', may be used to compute radio signal propagation path properties by replacing the original earth curvature, k value, in all functionalities where the k value is a variable. That is, by using the earth bulge factor value corresponding to the new distance, d', together with the old coordinates associated with the proposed site locations at d, the path design tool provides path loss profile data of the radio link that takes into account the path extension computed at 210 while using the same coordinate axis as would be used without the path extension. F(p) and F(p') are used by the design tool 100 to display the corrected elevation between the boundary 119a and boundary 119b which includes the path region 117 and extension regions 115a and 115b. This allows the path design tool 100 to display the line-of-sight and Fresnel zone boundary plots in section 102 using the old coordinates extending to d, but taking into account the earth bulge factor correction of the radio link path extending to d'. The simultaneous visualization of the path profile in section 102 along with the terrain and clutter of the extension regions 115a and 115b enable a user to easily assess different locations for the tower antennas within the extension regions. A user may also relocate any of the tower antennas to a new location within the extension regions without significant re-computation of the path profile given the computed earth curvature correction values.

Figure 4:
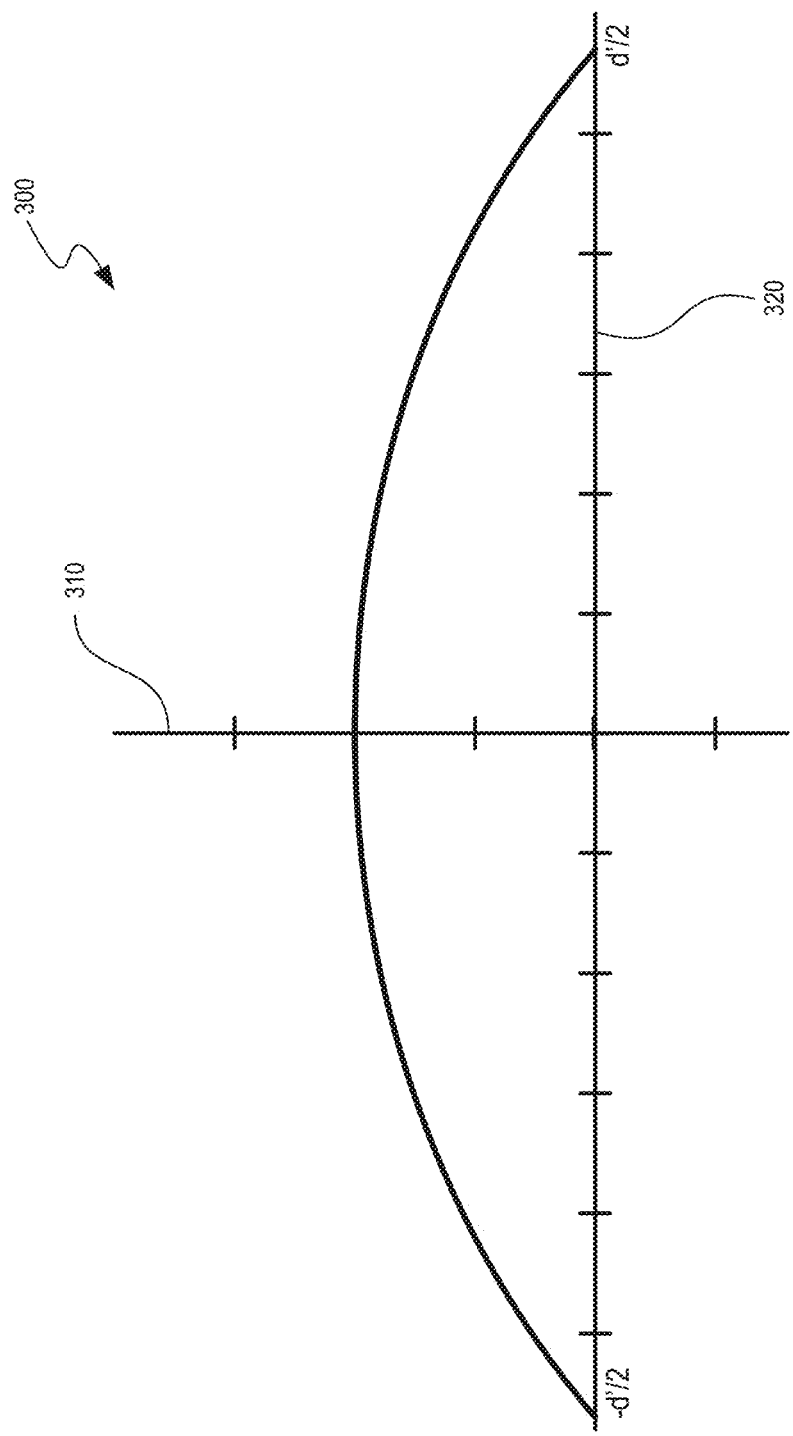
FIG. 4 is a graph of an earth curvature correction function that is utilized by the radio signal path design tool.

FIG. 4 shows an illustrative diagram of a graph 300 of the earth curvature correction function used to compute an earth curvature correction value at block 240. The graph 300 shows that the earth curvature correction function has even symmetry. That is, the earth curvature correction function is symmetric with respect to the y-axis 310 such that F(p)=F(−p), for all p lying between [−d'/2, d'/2].

An important feature of the earth curvature correction function illustrated in graph 300 and used to compute the earth curvature correction values in flow diagram 200 is that the difference between the earth curvature correction value computed at two points $p_a$ and $p_b$ depends only on the location of those two points and not on the distance d' or d between the site A 110 and site B 120. The difference in the earth curvature correction value between any two points $p_a$ and $p_b$ is equal to the difference in the squares of the points, i.e., $F(p_b)-F(p_a)=p_b^2-p_a^2=(p_b+p_a)(p_b-p_a)$. In other words, given the same k factor, the distance between any two points on the graph 300 does not change with different radio link distances. As a result, the earth curvature correction value between two points, $p_a$ and $p_b$, within the extended distance, d', or between the new coordinates, $(\Phi'_A, L'_A)$ and $(\Phi'_B, L'_B)$, will be the same as the earth curvature correction value between the same two points, $p_a$ and $p_b$, within the proposed distance, d, or between the old coordinates, $(\Phi_A, L_A)$ and $(\Phi_B, L_B)$. This property means that the path profile parameters such as the Fresnel boundary 140 will be the same for the proposed path region 117 with the extension regions 115a and 115b included (regardless of the size of the extension regions) or with the extension regions excluded.

In some embodiments, the two properties of the earth curvature correction function described above may be used to simplify the computation of the proposed path region 117 parameters. On one hand, because of the even symmetry of the earth curvature correction function, only the earth curvature correction values on one half of the graph 300, either the left hand side of the y-axis 310 or the right hand side of the y-axis 310, needs to be computed. For example, if the earth curvature correction value F(p) for a point, p, between [−d'/2,d'/2] is computed, the earth curvature correction value for a point, −p, F(−p) is simultaneously determined because F(p)=F(−p). Additionally, because the difference in the earth curvature correction value between two points, $p_a$ and $p_b$, is independent of the link distance for a given k factor, the earth curvature correction function may be used to normalize the original distance, d, and the extended distance, d', by computing a modified k factor, k'. For example, taking $p_a=0$ and $p_b=1$, yields $F(p_b)-F(p_a)=1$ regardless of whether the $p_a$ and $p_b$ points are along the [−d'/2, d'/2] or the [−d/2,d/2] segments. Furthermore, along the [−d'/2, d'/2] segments $F(p_a)$ is $d'^2/6k$, and along the [−d/2, d/2] segment $F(p_a)$ is $d^2/6k$. For this example, in order to continue to use the coordinate at d instead of the new coordinates at d', a modified k factor, $k'=(d'^2/d^2)*k$, may be used.

Although the discussions herein are based on extending the radio link along the trajectory of the line segment intersecting the two antenna sites, a person having ordinary skill in the art will appreciate that the same path extension methodology equally applies to instances where the path extension is defined by the area around the antenna sites azimuthally extending in all directions by a distance equivalent to the path extension defined at block 210.

Figure 5:
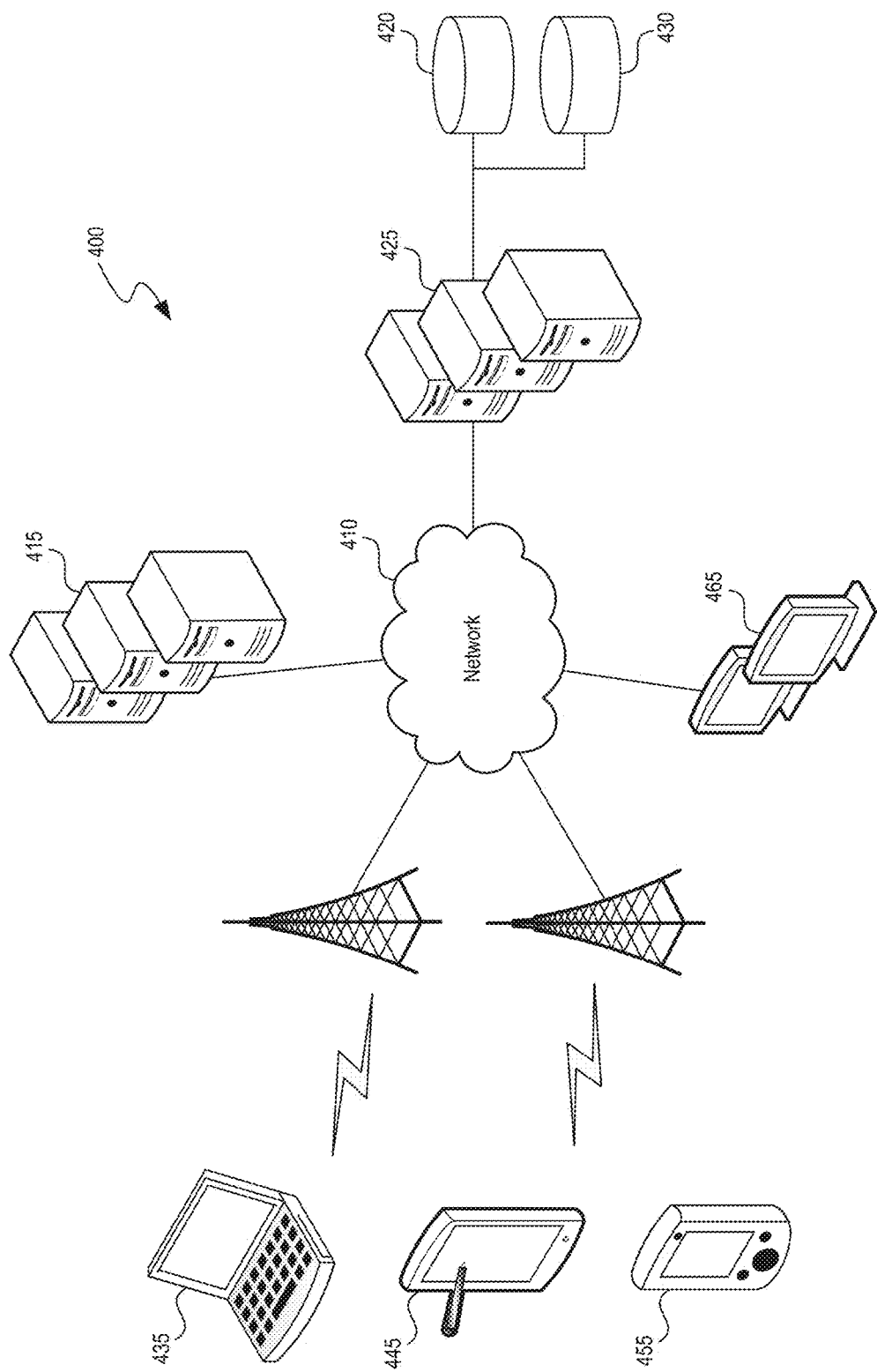
FIG. 5 is an exemplary environment in which the radio signal path design tool may operate.

FIG. 5 and the following discussion provide a brief, general description of a suitable environment in which a radio signal path design tool 100 may operate. Although not required, aspects of the invention are described in the general context of computer-executable instructions, such as routines executed by a general-purpose computer, a personal computer, a server, or other computing system. The tool can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or any combination of such components. Computer-executable instructions may also be stored in one or more storage devices, such as magnetic or optical-based disks, flash memory devices, or any other type of non-volatile storage medium or non-transitory medium for data. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes, modules and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Aspects of the radio signal path profiling tool can be practiced in distributed computing environments, where tasks or modules are performed by remote processing devices, which are linked through a communication network, such as a Local Area Network ("LAN"), Wide Area Network ("WAN"), or the Internet.

Referring to the example of FIG. 5, a representative environment 400 in which aspects of the described technology may operate include one or more client computing devices 435, 445, 455, and 465 capable of running a web browser of other desktop of server application, and servers 415 and 425, capable of interacting with a web server and remotely communicating with the client computing devices. The client computing devices communicate with the servers through network 410 including, for example, the Internet.

Aspects of the radio signal design tool may be practiced by the client computing devices 435, 445, 455, and 465 and server devices 415 and 425. For example, client computing devices could run a web browser to login to a web application on a web server hosted on the server devices 415 and 425, provide user input via the web browser to configure the radio link design input parameters as needed, and trigger the computation of radio signal path parameter computation on the web application or at the web server. The web application implementing the radio signal design tool, or the web server serving the web application, may obtain additional input data from third party storage devices or servers 420 and 430. These storage devices may also be connected to the web server or client devices through the network 410 or may be warehoused locally on the server computers 415 and 425, or on the client devices 435, 445, 455, and 465. Such input data could include, for example, National Land Cover Database (NLCD) data, Light Detection and Ranging (LI-DAR) data, and Federal Communication Commission (FCC) Microwave Source data.

Figure 6:
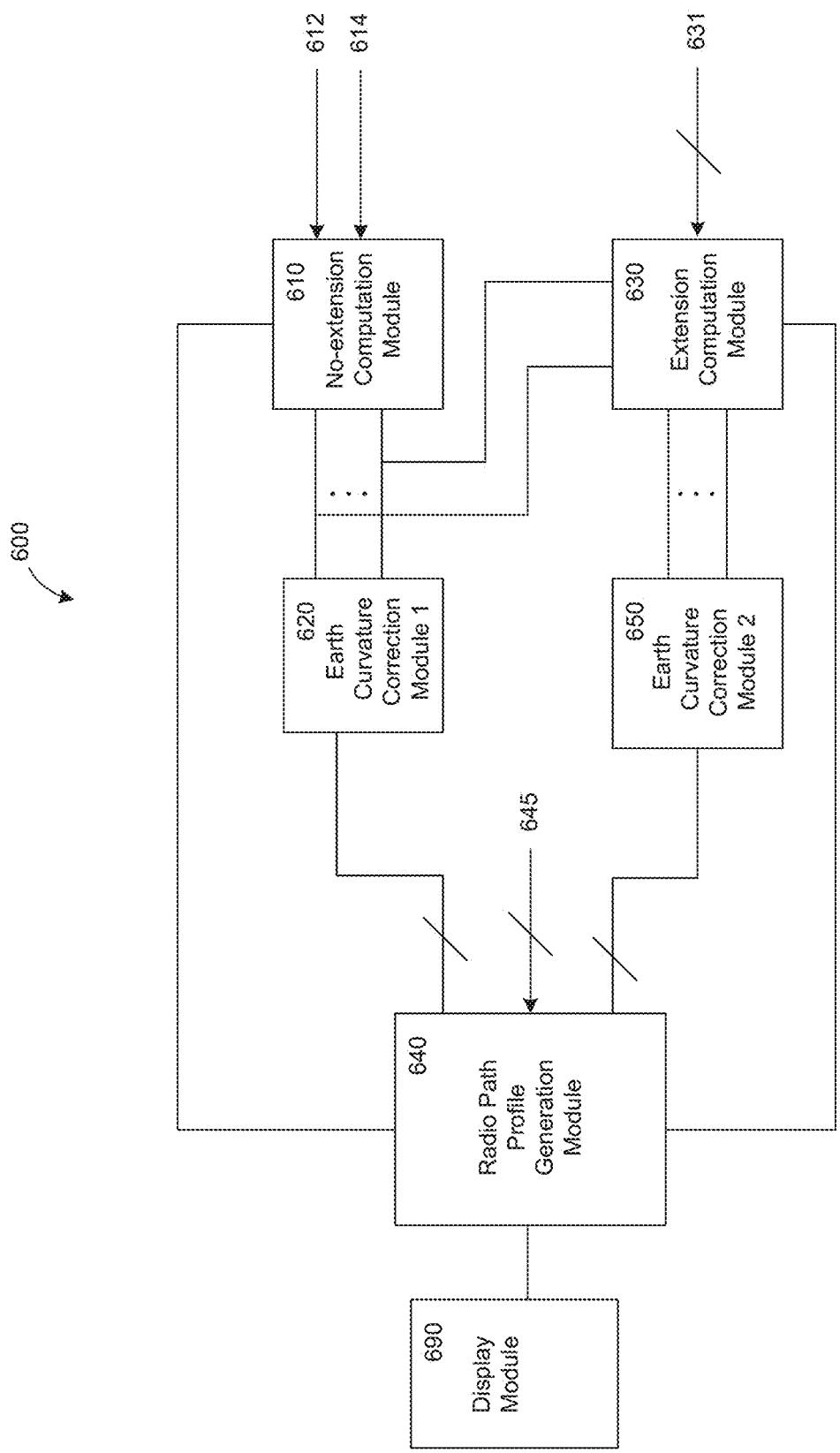
FIG. 6 is an exemplary system to implement the radio signal path design tool.

FIG. 6 is an exemplary system to implement the radio signal path design tool. A no-extension computation module 610 is configured to receive at input 612 a first proposed location of a first radio antenna (at site A), and at input 614 a second proposed location of a second radio antenna (at site B). The no-extension computation module 610 uses these received inputs to compute, among other things, the distance between the first radio antenna at site A and the second radio antenna at site B (the "first radio link distance"), and first coordinate points between site A and site B. A first earth curvature correction module 620 uses the computed distance between the first radio antenna at site A and the second radio antenna at site B, and the coordinate of points between site A and site B, to compute first earth curvature correction values along the first radio link distance. An extension computation module 630 is configured to accept various inputs 631 characterizing an extended path link, and, using the received inputs, determine a distance on either side of the first radio link by which to extend a radio signal path profile computation. In some embodiments, the extension computation module uses the distance between radio antenna sites computed by the no-extension computation module 610, together with the extension distance it calculates, to compute a second radio link distance. In other embodiments, the extension computation module also receives the inputs 612 and 614 to enable it to independently compute the second radio link distance. The extension computation module 630 also computes second coordinate points between the extended link distance. A second earth curvature correction module 650 uses the second coordinate points between the second radio link distance to compute second earth curvature correction values along the second radio link distance.

A radio path profile generation module 640 receives at inputs 645 antenna parameters such as the antenna gain, radiation pattern, frequency, VSWR, impedance, polarization, or radio transceiver parameters such as transmit power, modulation, coding rate, receiver sensitivity, among other parameters. In some embodiments, the additional inputs 645 may be determined by selecting the desired antenna and/or radio models from an existing database of antennas, in which case the design tool uses stored parameters associated with the selected antenna and/or radio. The radio path profile generation module 640 uses these inputs together the second earth curvature correction values to compute the radio link path profile along the first radio link distance. In some embodiments, a modified bulge factor computation module (not shown) computes a modified earth bulge factor using the first earth curvature correction values generated by correction module 620 and the second earth curvature correction values generated by correction module 650. The modified earth bulge factor may then be utilized to compute the path profile between the first radio link distance by replacing all functions where the earth bulge factor is a variable with the modified earth bulge factor.

A display module 690 is configured to generate a display of the first radio link based on the radio signal path profile computed by the radio path profile generation module 640. In addition to depicting the radio path profile such as the line-of-sign and Fresnel boundaries between the first radio link distance, the generated display also depicts clutter and the earth bulge along the entire second radio link distance (including the extension regions determined by extension module 630). The clutter and bulge allows the user of design tool 100 to easily visualize whether or not either proposed site for radio link antennas is the most appropriate site, or whether the radio link path design would benefit from relocation of either antenna along the extension distance. For example, the clutter or terrain in the extension distance might indicate that a proposed antenna location is on a hill or valley slope and that a line of sight would still be achieved by relocating the antenna further away to the top of the hill or valley. In some embodiments, design tool 100 suggests appropriate alternative locations within the extension distance that meet some path design objective such as maintaining a clear line of sight while minimizing antenna tower height. The alternative locations are determined by setting a minimum distance that the line of sight must exceed above the intervening clutter and terrain, and then determining which alternative locations along the extension distance generate a line of sight between towers that meets the line of sight limitation, while using the shortest overall tower heights.

While this patent document and attached appendices contain many specifics, these should not be construed as limitations on the scope of any disclosed methods or of what may be claimed, but rather as descriptions of features that may be specific to particular embodiments of particular disclosed methods. Certain features that are described in this patent document and attached appendices in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method to represent the suitability of potential antenna placement locations within extension distances beyond a targeted path, the method comprising:
   receiving a first latitude/longitude pair of a first proposed location of a first radio antenna, and a second latitude/longitude pair of a second proposed location of a second radio antenna, the first and second radio antennas forming a radio link along a targeted path, wherein the targeted path extends between the first and second latitude/longitude pairs;
   receiving a first set of parameters characterizing the first radio antenna and a first radio coupled to the first radio antenna, and a second set of parameters characterizing the second radio antenna and a second radio coupled to the second radio antenna, the first and second radios establishing a communication link;
   determining a first extension distance around the first proposed location, and a second extension distance around the second proposed location, the first extension distance, the second extension distance, and the targeted path collectively comprising an extended distance;
   computing radio signal propagation parameters for the radio link based on earth curvature correction values computed along the extended distance, the first set of parameters, and the second set of parameters; and
   generating a display of the radio link between the first and second radio antennas based on the computed radio signal propagation parameters, the display depicting terrain for the extended distance.

2. The method of claim 1, wherein the first extension distance around the first proposed location or the second extension distance around the second proposed location is based on a percentage of the targeted path extending between the first and second latitude/longitude pairs.

3. The method of claim 1, wherein computing the radio signal propagation parameters for the radio link comprises:
   computing earth curvature correction values along the extended distance;
   computing a modified earth bulge factor value based on the earth curvature correction values; and
   computing the radio signal propagation parameters for the radio link based on the modified earth bulge factor value.

4. The method of claim 1, wherein receiving the first set of parameters for the first radio antenna and radio, and the second set of parameters for the second radio antenna and radio further comprises:
   maintaining parameters for a plurality of radio antenna models;
   receiving a user selection of a first radio antenna model and a second radio antenna model; and determining, from the maintained parameters, the first set of parameters corresponding to the first radio antenna, and the second set of parameters corresponding to the second radio antenna.

5. The method of claim 1, wherein receiving the first set of parameters for the first radio antenna and radio, and the second set of parameters for the second radio antenna and radio further comprises:
maintaining parameters for a plurality of radio models;
receiving a user selection of a first radio model and a second radio model; and
determining, from the maintained parameters, the first set of parameters characterizing the first radio and the second set of parameters characterizing the second radio.

6. The method of claim 1, wherein receiving the first set of parameters for the first radio antenna and radio, and the second set of parameters for the second radio antenna and radio further comprises:
receiving an indication of an antenna property; and
receiving a value corresponding to the indicated antenna property.

7. The method of claim 1, wherein the parameters characterizing the first and second radio antennas comprise at least one of an antenna gain, antenna beam width, or antenna polarization.

8. The method of claim 1, wherein the parameters characterizing the first and second radios comprise at least one of a modulation order, a coding rate, or a transmit power.

9. The method of claim 1, further comprising:
displaying a first plurality of points within the first extension distance and a second plurality of points within the second extension distance, each of the first and second plurality of points visually depicting a suitability of the point as an alternative antenna placement site based on the computed radio signal propagation parameters,
wherein the suitability of a point is based on if an antenna placed at that point meets a specified path design objective.

10. The method of claim 9, wherein the specified path design objective is a specified amount of Fresnel Zone clearance for a specified targeted path distance or a specified height for the radio antenna placed at that point.

11. The method of claim 9, wherein the specified path design objective is achieving a line-of-sight propagation path.

12. The method of claim 1, wherein the computed radio signal propagation parameters for the radio link comprises Fresnel zone boundaries.

13. The method of claim 1, wherein the computed radio signal propagation parameters for the radio link comprises a path loss profile.

14. A non-transitory computer-readable medium encoded with instructions that, when executed by a processor, perform a method in a computing system of generating a radio signal propagation path profile, the method comprising:
receiving a first proposed location of a first radio antenna, and a second proposed location of a second radio antenna, the first and second radio antennas forming a radio link along a targeted path;
receiving a first set of parameters characterizing the first radio antenna and a first radio coupled to the first radio antenna, and a second set of parameters characterizing the second radio antenna and a second radio coupled to the second radio antenna, the first and second radios establishing a communication link;
determining a first extension distance around the first proposed location, and a second extension distance around the second proposed location, the first extension distance, the second extension distance, and the targeted path collectively comprising an extended distance;
computing radio signal propagation parameters for the radio link based on earth curvature correction values computed along the extended distance, the first set of parameters, and the second set of parameters; and
generating a display of the radio link between the first and second radio antennas based on the computed radio signal propagation parameters, the display depicting terrain for the extended distance.

15. The computer-readable medium of claim 14, wherein the display further depicts clutter for the extended distance.

16. The computer-readable medium of claim 14, wherein the display further depicts alternative locations along the extended distance capable of achieving a line-of-sight propagation path with the shortest height of antenna towers.

17. The computer-readable medium of claim 14, wherein determining the first and second extension distances further comprises:
receiving a user input of the first extension distance around the proposed location for the first radio antenna and the second extension distance around the proposed location for the second radio antenna,
the user input comprising at least one of a selection of a predetermined distance from a plurality of predetermined extension distances, an entered absolute value of the extension distance, or an entered percentage value of the extension distance,
wherein the entered percentage value is a percentage of the first distance.

18. The computer-readable medium of claim 17, wherein the first set of parameters and the second set of parameters comprise a frequency band, a transmit power, or an antenna gain.

* * * * *